(12) United States Patent
Bye

(10) Patent No.: US 9,599,474 B2
(45) Date of Patent: Mar. 21, 2017

(54) TECHNIQUE TO IMPROVE NAVIGATION PERFORMANCE THROUGH CAROUSELLING

(75) Inventor: Charles T. Bye, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1531 days.

(21) Appl. No.: 12/419,156

(22) Filed: Apr. 6, 2009

(65) Prior Publication Data

US 2010/0256907 A1 Oct. 7, 2010

(51) Int. Cl.
G01C 21/16 (2006.01)
G01C 25/00 (2006.01)

(52) U.S. Cl.
CPC .......... G01C 21/16 (2013.01); G01C 21/165 (2013.01); G01C 25/00 (2013.01)

(58) Field of Classification Search
CPC ...... B60T 8/172; G07C 5/008; B60R 16/0231
USPC .............................. 701/505, 508, 509, 510, 1
See application file for complete search history.

(56) References Cited

U.S. PATENT DOCUMENTS

| | | | |
|---|---|---|---|
| 4,168,813 A | 9/1979 | Pinson et al. | |
| 4,202,516 A | 5/1980 | Benser | |
| 4,212,443 A | 7/1980 | Duncan et al. | |
| 4,754,280 A * | 6/1988 | Brown et al. | 342/357.59 |
| 4,800,501 A | 1/1989 | Kinsky | |
| 5,042,156 A | 8/1991 | Huddle | |
| 5,060,392 A | 10/1991 | Grasso | |
| 5,396,326 A | 3/1995 | Knobbe et al. | |
| 5,421,187 A | 6/1995 | Morgan | |
| 5,984,237 A * | 11/1999 | Goodzeit | 244/169 |

(Continued)

FOREIGN PATENT DOCUMENTS

CN 1908584 A 2/2007

OTHER PUBLICATIONS

European Patent Office, "European Search Report from EP Application No. 10156147.0 mailed Aug. 1, 2014", "from Foreign Counterpart of U.S. Appl. No. 12/419,156", Aug. 1, 2014, pp. 1-4, Published in: EP.

(Continued)

*Primary Examiner* — Florian Zeender
*Assistant Examiner* — Fawaad Haider
(74) *Attorney, Agent, or Firm* — Fogg & Powers LLC

(57) ABSTRACT

A method to improve estimation and stabilization of heading in an inertial navigation system is provided. The method includes operating an inertial measurement unit oriented in a first orientation, forward-rotating the operational inertial measurement unit by a selected-rotation angle about a Z-body axis of the inertial navigation system, wherein the inertial measurement unit is oriented in a second orientation, operating the inertial measurement unit oriented in the second orientation, reverse-rotating the operational inertial measurement unit by the selected-rotation angle about the Z-body axis, wherein the inertial measurement unit is oriented in the first orientation, continuously receiving information indicative of an orientation of the inertial measurement unit at a rotational compensator, and continuously-rotationally compensating navigation module output at the rotational compensator, wherein output of the rotational compensator is independent of the rotating.

8 Claims, 5 Drawing Sheets

(56) References Cited

U.S. PATENT DOCUMENTS

| | | | |
|---|---|---|---|
| 6,023,986 A * | 2/2000 | Smith et al. | 73/866.5 |
| 6,152,403 A | 11/2000 | Fowell et al. | |
| 6,209,383 B1 | 4/2001 | Mueller et al. | |
| 6,778,908 B2 * | 8/2004 | Martorana et al. | 702/9 |
| 6,834,528 B2 | 12/2004 | Kappi et al. | |
| 6,918,186 B2 | 7/2005 | Ash et al. | |
| 6,968,281 B2 | 11/2005 | Hanse | |
| 7,065,891 B2 | 6/2006 | Campbell et al. | |
| 7,066,004 B1 | 6/2006 | Kohler et al. | |
| 7,093,370 B2 | 8/2006 | Hansberry et al. | |
| 7,212,944 B1 * | 5/2007 | Kohler et al. | 702/145 |
| 7,275,008 B2 | 9/2007 | Plyvanainen | |
| 2002/0116125 A1 | 8/2002 | Lin | |
| 2002/0116126 A1 * | 8/2002 | Lin | 701/214 |
| 2003/0198364 A1 * | 10/2003 | Yonover et al. | 382/103 |
| 2003/0236628 A1 | 12/2003 | Martorana et al. | |
| 2005/0022402 A1 | 2/2005 | Ash et al. | |
| 2005/0022404 A1 | 2/2005 | Ash et al. | |
| 2006/0122775 A1 * | 6/2006 | Soehren | 701/220 |
| 2007/0017287 A1 | 1/2007 | Kubena et al. | |
| 2007/0032951 A1 * | 2/2007 | Tanenhaus et al. | 701/220 |
| 2007/0096979 A1 * | 5/2007 | Hinnant et al. | 342/357.06 |
| 2007/0100550 A1 * | 5/2007 | Hawkinson | 701/220 |
| 2007/0118286 A1 | 5/2007 | Wang et al. | |
| 2007/0282529 A1 * | 12/2007 | Thompson et al. | 701/220 |
| 2008/0105050 A1 * | 5/2008 | Kraetz | 73/496 |
| 2008/0109141 A1 * | 5/2008 | Nichols et al. | 701/50 |
| 2008/0195316 A1 * | 8/2008 | Krishnaswamy | 701/213 |
| 2008/0319667 A1 * | 12/2008 | Hawkinson et al. | 701/220 |
| 2009/0326740 A1 * | 12/2009 | Wang | 701/3 |
| 2010/0121601 A1 * | 5/2010 | Eckert | 702/104 |

OTHER PUBLICATIONS

European Patent Office, "Office Action from EP Application No. 10156147.0 mailed Aug. 19, 2014", Aug. 19, 2014, pp. 1-15, Published in: EP.

* cited by examiner

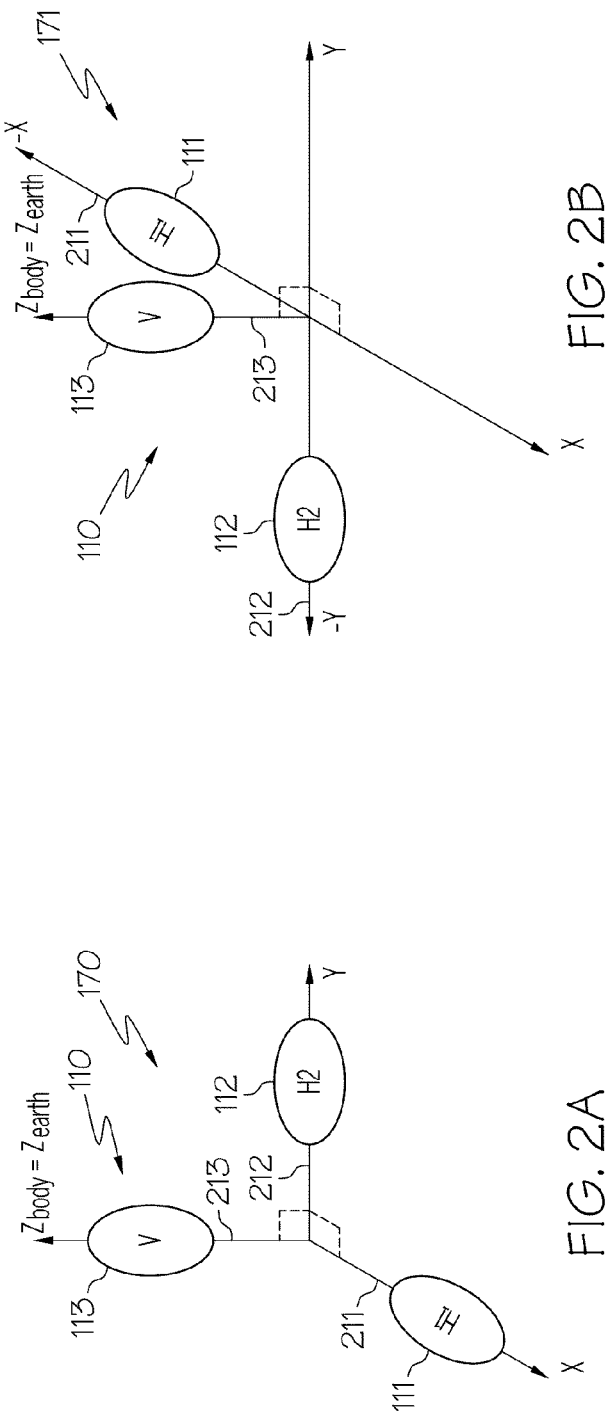
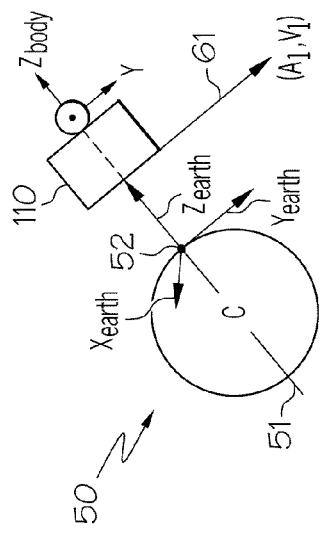
FIG. 2B
FIG. 2C
FIG. 2A

TECHNIQUE TO IMPROVE NAVIGATION PERFORMANCE THROUGH CAROUSELLING

BACKGROUND

Navigation systems (such as, inertial navigation systems (INS), attitude heading reference systems (AHRS)) that use micro-electro-mechanical system (MEMS) sensors cannot gyrocompass, since MEMS sensors are low quality gyroscopes, typical greater than 2 degrees per hour bias stability for over periods, generally, greater than 10 minutes (long-term), but less than 2 degrees/hour bias for periods, generally, shorter than 10 minutes (short-term). Therefore navigation systems that include MEMS gyroscopes cannot gyro compass and display unacceptable heading drift during free inertial navigation. The inertial sensors (inertial measurement units) with performance better than 2 degrees per hour must be used in navigations system to enable gyro-compassing and prevent this unacceptable heading drift during free inertial navigation. These high performance inertial sensors are expensive and limit the application that can use low cost MEMS gyros.

SUMMARY

The present application relates to a method to improve estimation and stabilization of heading in an inertial navigation system. The method includes operating an inertial measurement unit oriented in a first orientation, forward-rotating the operational inertial measurement unit by a selected-rotation angle about a Z-body axis of the inertial navigation system, wherein the inertial measurement unit is oriented in a second orientation, operating the inertial measurement unit oriented in the second orientation, reverse-rotating the operational inertial measurement unit by the selected-rotation angle about the Z-body axis, wherein the inertial measurement unit is oriented in the first orientation, continuously receiving information indicative of an orientation of the inertial measurement unit at a rotational compensator, and continuously-rotationally compensating navigation module output at the rotational compensator, wherein output of the rotational compensator is independent of the rotating.

The details of various embodiments of the claimed invention are set forth in the accompanying drawings and the description below. Other features and advantages will become apparent from the description, the drawings, and the claims.

DRAWINGS

FIGS. 2A-2B show an inertial measurement unit positioned in a first orientation and a second orientation, respectively, in accordance with the present invention.

FIG. 2C shows the inertial measurement unit of FIGS. 2A-2B with respect to earth-referenced axes in accordance with the present invention.

Like reference numbers and designations in the various drawings indicate like elements.

DETAILED DESCRIPTION

The inertial navigation system described herein enables inertial sensors with long-term biases worse than 2 degrees per hour to gyro compass when the short term (i.e., on the order of minutes) gyro bias stability is less than 2 degrees/hour. The physical act of rotating the inertial measurement unit, as described herein, physically distributes (and thereby reduces) the long-term bias error in the gyroscopes in the inertial measurement unit. The Kalman filter generates error correction data for both the rotational software and hardware; and the error correction data for the navigation module.

Figure 1:
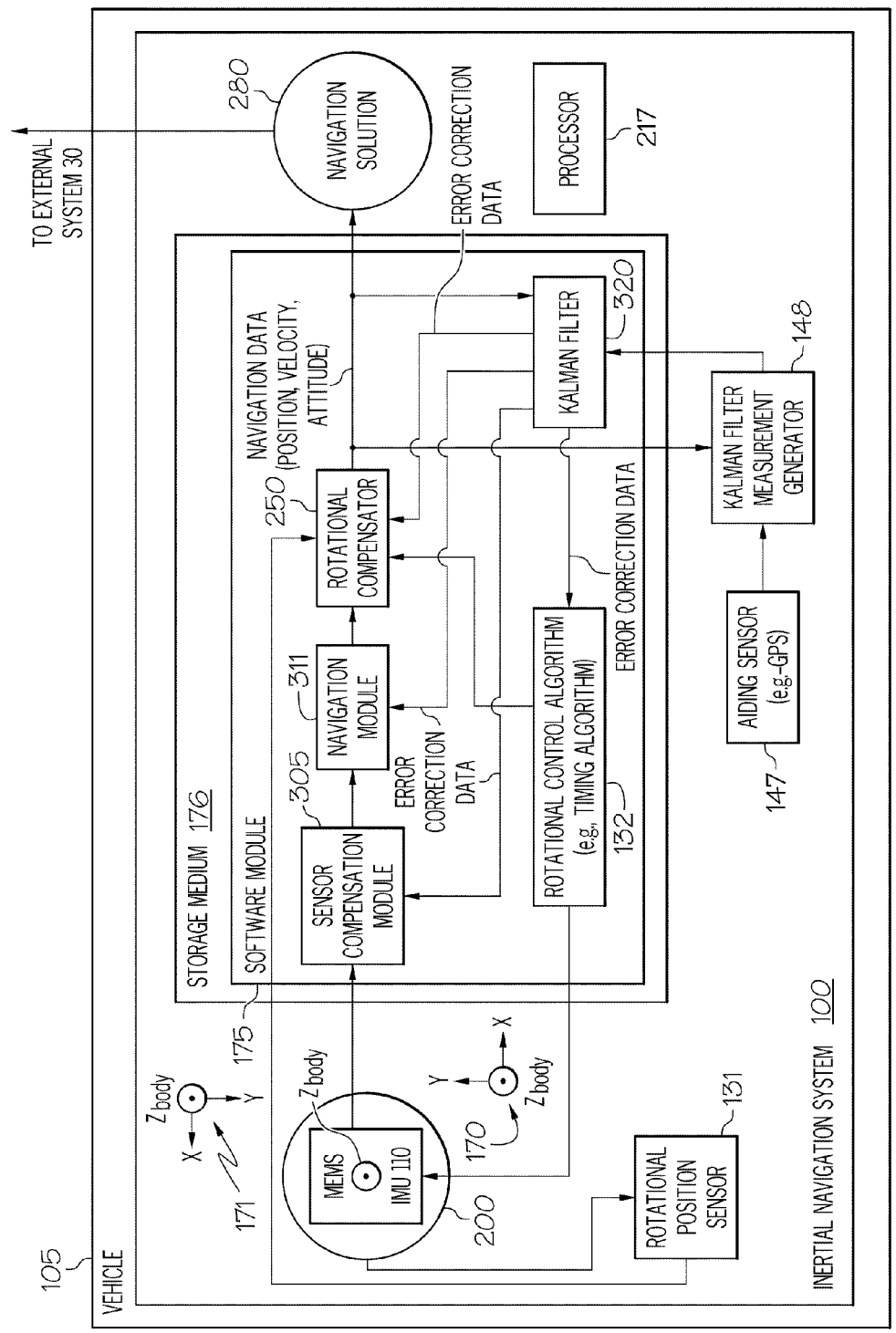
FIG. 1 is a block diagram of one embodiment of an inertial navigation system in accordance with the present invention.

FIG. 1 is a block diagram of one embodiment of an inertial navigation system 100 in accordance with the present invention. The inertial navigation system 100 on a vehicle 105 includes an inertial measurement unit (MEMS IMU) 110 that includes three orthogonally mounted gyroscopes and three associated accelerometers. The inertial navigation system 100 also includes a rotational device 200 on which the inertial measurement unit 110 is positioned (fixedly attached). The rotational device 200 is configured to rotate the inertial measurement unit 110 about a Z-body axis $Z_{body}$ of the inertial navigation system 100 from a first orientation 170 to a second orientation 171. The rotating of the inertial measurement unit 110 physically distributes the long-term bias error in the gyroscopes in the inertial measurement unit 110 and thereby reduces the long-term bias error in the gyroscopes.

As shown in FIG. 1, the basis vectors (X, Y, $Z_{body}$) of the first orientation 170 and the second orientation 171 are offset from the inertial measurement unit 110 and the rotational device 200, for ease of viewing, although the Z-body axis $Z_{body}$ of the inertial navigation system 100 is the axis of rotation of the rotational device 200. The axis of rotation of the rotational device 200 can be any axis within the vehicle 105.

In one implementation of this embodiment, the input axis of one of the three gyroscopes in the inertial measurement unit 110 is aligned to be parallel to and overlapping the axis of rotation of the rotational device 200 (i.e., Z-body axis $Z_{body}$). In another implementation of this embodiment, none of the input axes of the gyroscopes the inertial measurement unit 110 are aligned with the Z-body axis $Z_{body}$ about which the rotational device 200 rotates. In this case, the horizontal sensing and vertical sensor gyroscopes are virtual sensors and the generation of the virtual sensor is accomplished through mathematically rotating the sensor data into the body axes of the rotation device 200.

As shown in FIG. 1, the first orientation 170 is represented generally by the vectors (X, Y, $Z_{body}$) in which the Z axis is parallel to the Z-body axis $Z_{body}$. The second orientation 171 is represented by the same vectors (X, Y, Z) after a rotation of 180° about the Z-body axis $Z_{body}$. In this exemplary configuration, when the vehicle 105 is travelling in a plane parallel to a tangential plane of the earth, the Z-body axis $Z_{body}$ is equal to the vertical-earth axis $Z_{earth}$. In this exemplary configuration, when the vehicle 105 is an airborne vehicle that is diving, the Z-body axis $Z_{body}$ is not parallel to the vertical-earth axis $Z_{earth}$ during the dive. The distribution and reduction of the long-term bias error in the inertial measurement unit 110 resultant from the rotating the inertial measurement unit 110 is most effective (i.e., the reduction of long-term bias error is maximized) when the Z-body axis $Z_{body}$ axis is parallel to the vertical-earth axis $Z_{earth}$.

As defined herein, the vertical-earth axis $Z_{earth}$ is parallel to the gravitational force vector on the inertial measurement unit 110 and is perpendicular to the plane tangential to the earth's surface beneath the inertial measurement unit 110. The plane tangential to the earth's surface is not a local surface but rather a smoothed surface in which variations in the altitude of the earth's surface (e.g., mountains and valleys) are averaged out.

The inertial navigation system 100 also includes a software module 175 and a rotational position sensor 131 to sense the orientation of the inertial measurement unit 110 and/or the rotational device 200. The inertial navigation system 100 also includes a storage medium 176 in which the software module 175 is stored, an aiding sensor 147, a Kalman filter measurement generator 148, and at least one processor 217 to execute the software in the software module 175.

The software module 175 includes a sensor compensation module 305, a navigation module 311, a rotational compensator 250, a Kalman filter 320, and a rotational control algorithm 132. In embodiments, the inertial navigation system 100 includes a memory (not shown). The software module 175 is configured to remove the effect of the rotation of the inertial measurement unit 110. This improves the ability of the inertial navigation system 100 to estimate the heading and to stabilize the heading. By physically rotating the rotational device 200 (and the fixedly attached inertial measurement unit 110) about the Z-body axis $Z_{body}$ and by removing the effect of the rotation of the inertial measurement unit 110 in the software module 175, the heading error is less than it would be without the carouselling rotation of the inertial measurement unit 110 about the Z-body axis $Z_{body}$.

The rotational control algorithm 132 sends instructions to the rotational device 200 to control the rotation of the rotational device 200. The rotational device 200 is configured to rotate the fixedly attached inertial measurement unit 110 by one hundred eighty (180) degrees from the first orientation 170 to the second orientation 171 in one or more rotation steps. Based on the input received from the rotational control algorithm 132, the rotational device 200 rotates the inertial measurement unit 110.

A mechanical system (not shown) drives the rotational device 200 to rotate to a specified orientation based on the instructions received form the rotational control algorithm 132, and the fixedly attached inertial measurement unit 110 is likewise rotated to the specified orientation. The mechanical system can include motors, chains, belts, cogs, cams, and other mechanical devices to effect a rotation of the rotational device 200. In one implementation of this embodiment, the mechanical system is part of the rotational device 200.

The inertial measurement unit 110 sends output data to the sensor compensation module 305. The sensor compensation module 305 receives the input from the inertial measurement unit 110 and compensates the inertial measurement unit 110 for errors modeled in the Kalman filter 320 or determined during initial calibration at the factory. The sensor compensation module 305 outputs information indicative of output from the inertial measurement unit 110 to the navigation module 311. The sensor compensation module 305 receives the error correction data output from the Kalman filter 320.

The navigation module 311 generates navigation data based on input received from the inertial measurement unit 110. Specifically, the navigation module 311 calculates velocity, position, and heading (also referred to herein as attitude or azimuth) based on information indicative of output of the inertial measurement unit 110 received from the sensor compensation module 305. The navigation module 311 includes the software/firmware to function as the navigation processor for the inertial navigation system 100. The navigation module 311 sends the information indicative of the position, velocity, and attitude of the vehicle 105 to the rotational compensator 250.

The rotational position sensor 131 sends the information indicative of the orientation of the inertial measurement unit 110 to the rotational compensator 250. The rotational compensator 250 continuously receives information indicative of the orientation of the inertial measurement unit 110 in the data output from the rotational position sensor 131. The rotational compensator 250 continuously-rotationally compensates the input received from navigation module 311 so that the output of the rotational compensator 250 is independent of the rotating. The rotational compensator 250 outputs information indicative of the position, velocity, and attitude (referred to as a navigation solution 280), which is independent of the orientation of the inertial measurement unit 110 to Kalman filter 320 and an external system 30.

The aiding sensor 147 inputs aiding information (such as a position of the vehicle 105) to the Kalman filter measurement generator 148. The Kalman filter measurement generator 148 generates measurement data that is sent to the Kalman filter 320.

The Kalman filter 320 receives the navigation solution 280 from the rotational compensator 250 and the aiding information from the aiding sensor 147. The Kalman filter 320 compares the aiding information received from aiding sensor 147 via the Kalman filter measurement generator 148 and the calculated position data received from the navigation module 311 (after compensation for rotation by the rotational compensator 250) and continuously estimates errors in the rotation generation algorithm 132, the rotation position sensor 131, the inertial measurement unit 110, the sensor compensation module 305, the navigation module 311, and the rotational compensator 250.

The Kalman filter 320 sends the generated error-correction data to the rotation generation algorithm 132, the sensor compensation module 305, the navigation module 311, and the rotational compensator 250. Specifically, if there is a difference between the reference position and the calculated position, the Kalman filter 320 determines if there is an error in the inertial measurement unit 110 and/or the rotational position sensor 131 and sends error-correction data to the rotational control algorithm 132, the sensor compensation module 305, the navigation module 311, and the rotational compensator 250. In one implementation of this embodiment, the navigation module 311 writes the error-correction data generated by the Kalman filter 320 into a non-volatile memory (not shown). The error correction data generated by the Kalman filter 320 is stored in the non-volatile memory for use the next time the system is turned on. In this manner, the navigation solution 280 is corrected for any inertial measurement unit 110 or rotational position sensor 131 errors. The navigation solution 280 is output from the rotational compensator 250 to the external system 30 and to the Kalman filter 320.

The inertial navigation system 100 shown in FIG. 1 is located on the vehicle 105. The external system 30 is another system located on the vehicle 105. In one implementation of this embodiment, the external system 30 is a system in a ground station that is communicatively coupled to the vehicle 105.

In one implementation of this embodiment, the aiding sensor 147 is a global positioning system receiver 147 to input information related to a position of the vehicle 105 to the Kalman filter 148. In another implementation of this embodiment, the inertial measurement unit 110 is a MEMS inertial measurement unit 110 with greater than 2 degrees per hour long-term bias. In this case, the inertial navigation system 100 is a lower cost inertial navigation system 110. The vehicle 105 can be any type of vehicle, including a marine vehicle, a ground vehicle, a missile, an unmanned aircraft, or a manned aircraft, such as a jet, airplane, or helicopter.

FIGS. 2A-2B show an inertial measurement unit 110 positioned in a first orientation 170 and a second orientation 171. FIG. 2C shows the inertial measurement unit 110 of FIG. 1 with respect to earth-referenced axes ($X_{earth}$, $Y_{earth}$, $Z_{earth}$). As shown in FIG. 2C, the line 51 extending through the center "c" of the earth 50 to the inertial measurement unit 110 intersects the surface of the earth 50 at the point 52. The plane spanned by the $x_{earth}$ axis and the $y_{earth}$ axis is the plane tangential to the earth's surface beneath the inertial measurement unit 110. The plane spanned by the $x_{earth}$ axis and the $y_{earth}$ axis is perpendicular to the vertical-earth axis $Z_{earth}$. In the embodiment shown in FIG. 2C, the vertical-earth axis $Z_{earth}$ is parallel to the Z-body axis $Z_{body}$. The vertical-earth axis $Z_{earth}$ does not have to be parallel to the Z-body axis $Z_{body}$, however, as described above, the reduction of long-term bias error in the inertial measurement unit 110 is maximized when the inertial measurement unit 110 is rotated about a Z-body axis $Z_{body}$ axis that is parallel to the vertical-earth axis $Z_{earth}$.

The inertial measurement unit 110 includes a first-horizontal-sensing gyroscope 111, a second-horizontal-sensing gyroscope 112, and a vertical-sensing gyroscope 113 that are orthogonally mounted with respect to each other. The inertial measurement unit 110 includes accelerometers associated with each of the gyroscopes 111-113 (not shown). The rotational device 200 (FIG. 1) is configured to rotate the inertial measurement unit 110 about the Z-body axis $Z_{body}$ of the inertial navigation system 100 from a first orientation 170 (FIG. 2A) to a second orientation 171 (FIG. 2B). The input axis 211 of the first-horizontal-sensing gyroscope 111 is in the positive X direction (in the IMU basis) in the first orientation 170. After the rotation of 180 degrees in a first (single) rotation step, the input axis 211 of the first-horizontal-sensing gyroscope 111 is in the negative X direction in the second orientation 170. The input axis 212 of the second-horizontal-sensing gyroscope 112 is in the positive Y direction in the first orientation 170. After the rotation of 180 degrees in a first (single) rotation step, the input axis 212 of the second-horizontal-sensing gyroscope 112 is in the negative Y direction in the second orientation 170.

In one implementation of this embodiment, the vehicle 105 (shown in FIG. 2C to be above the earth's surface) travels in the direction 61 in the ($x_e$, $y_e$, $z_e$) space at a constant velocity $V_1$, while the methods of improving navigation performance of the vehicle 105 described herein are being implemented. In another implementation of this embodiment, the vehicle 105 is stationary, while the methods of improving navigation performance of the vehicle 105 described herein are being implemented. In yet another implementation of this embodiment, the vehicle 105 is accelerating at an acceleration $A_1$ in the ($x_e$, $y_e$, $z_e$) space, while the methods of improving navigation performance of the vehicle 105 described herein are being implemented.

The method described herein is implemented by a rotation of the inertial measurement unit 110 about the Z-body axis $Z_{body}$. The rotation of the inertial measurement unit 110 about the Z-body axis $Z_{body}$, while the Kalman filter 320 is detecting errors, serves to distribute the error so that it is cancelled out during a rotation cycle from the first orientation 170 to the second orientation 170 and back to the first orientation 170. The gyro biases (long term) are physically canceled during consecutive operations is the first orientation 170 for a pre-selected time duration and in the second orientation 171 for the same pre-selected time duration. This enables the navigation state (e.g., heading) to be estimated using sensors of reduced quality to an accuracy not achievable without implementing the method described herein. The vehicle 105 can include inexpensive MEMS inertial measurement units 110 with low quality gyroscopes and not experience heading drift during free inertial navigation.

Figure 3:
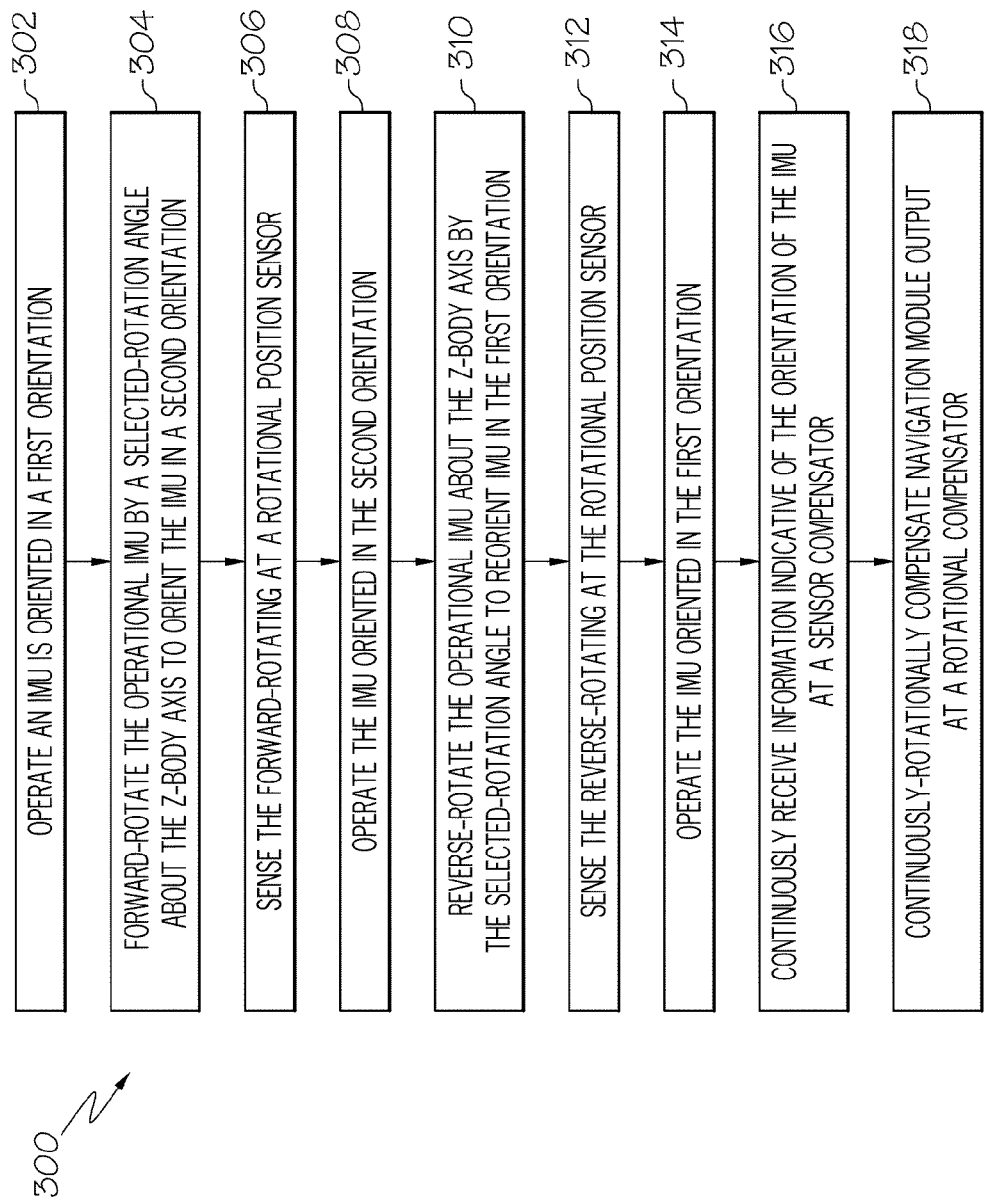
FIG. 3 is a flow diagram of one embodiment of a method to stabilize heading in an inertial navigation system in accordance with the present invention.
Figure 4B:
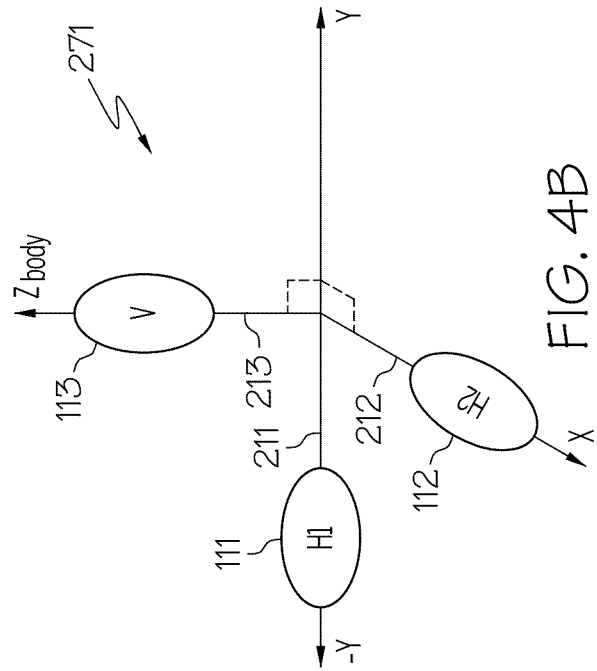
FIGS. 4A-4D show an inertial measurement unit positioned in a first orientation, a second orientation, a third orientation, and a fourth orientation, respectively, in accordance with the present invention.
Figure 4A:
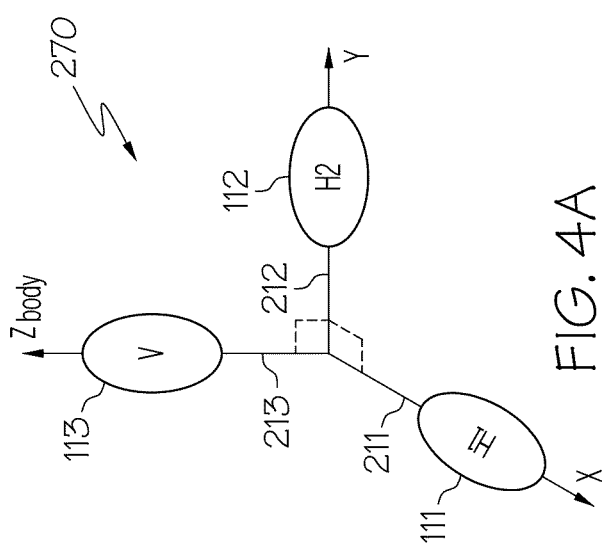
Figure 4C:
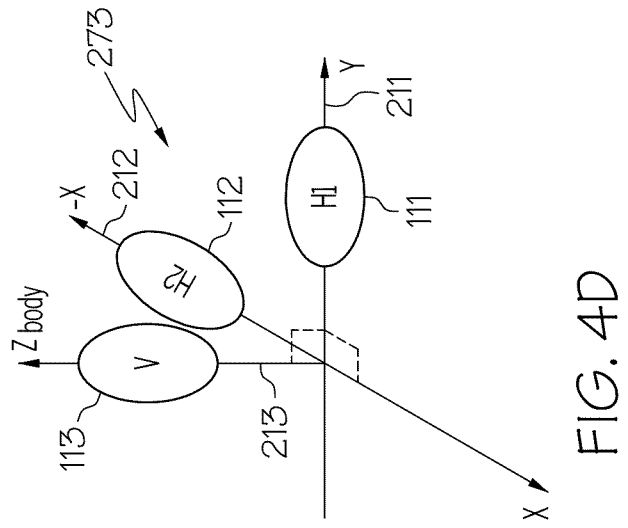
Figure 4D:
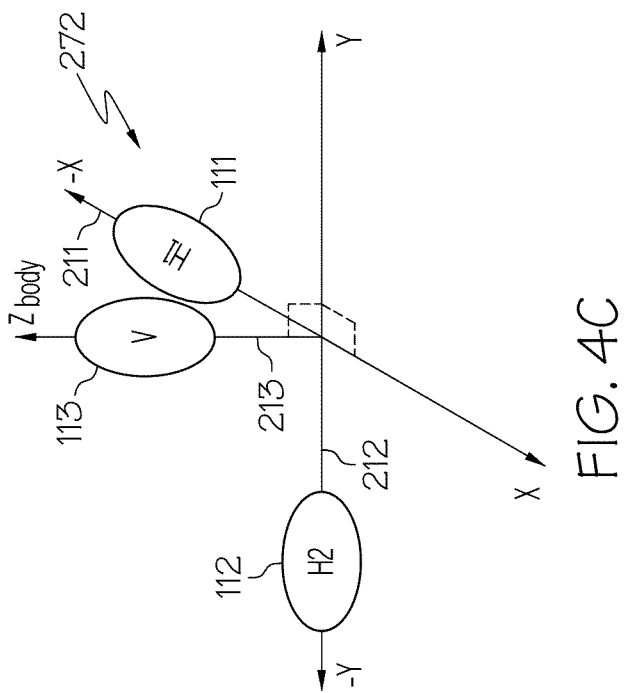

FIG. 3 is a flow diagram of one embodiment of a method 300 to stabilize heading in an inertial navigation system in accordance with the present invention. The implementation of method 300 is described with reference to the inertial measurement unit 110 in the inertial navigation system 100 of FIGS. 1, 2A, and 2B. It is to be understood that method 300 can be implemented with other inertial navigation systems.

The three-orthogonally-mounted gyroscopes (the first-horizontal-sensing gyroscope 111, the second-horizontal-sensing gyroscope 112, and the vertical-sensing gyroscope 113) in the inertial measurement unit 110 are operated while the vehicle 105 is moving or stationary and the inertial measurement unit 110 is oriented in a first orientation 170 (block 302). The inertial measurement unit 110 is held in the first orientation 171 for a pre-selected time duration. The pre-selected time duration is selected based on a design decision regarding how fast the rotational device 200 can be rotated and how long the designer wants the inertial measurement unit 110 to be in motion. In one implementation of this embodiment, the pre-selected time duration is 1 minute. In another implementation of this embodiment, the pre-selected time duration is 15 seconds.

The Kalman filter 320 receives position input for the vehicle 105 from the aiding sensor 147 and a navigation solution 280 from the rotational compensator 250 during this time. The Kalman filter 148 estimates and corrects for the heading error of the inertial measurement unit 110 when the inertial measurement unit 110 is in the first orientation 170 based on the input from the aiding sensor 147 and the rotational compensator 250.

While the inertial measurement unit 110 continues to operate, the inertial measurement unit 110 is forward-rotated about the Z-body axis $Z_{body}$ by a selected-rotation angle so that the inertial measurement unit 110 is orientated in the second orientation 171 (block 304). The time taken to rotate from the first orientation 170 to the second orientation 172 is referred to herein as the duration-of-rotation. The selected-rotation angle is one hundred eighty (180) degrees when there is a single rotational step. When the rotation step is completed, the inertial measurement unit 110 is oriented in a second orientation 171 as shown in FIG. 2B. The forward-rotating is sensed at the rotational position sensor 131 (block 306). Information indicative of the angular orientation of the rotational device 200 is sent to the sensor compensation module 305. In one implementation of this embodiment, the pre-selected time duration is 2 minutes and the duration-of-rotation is about 2 seconds.

The rotational control algorithm 132 controls the forward-rotating. The rotational control algorithm 132 sends instructions to the rotational device 200 to start and stop the rotation. The rotational device 200 responds to the rotation-instructions from the rotational control algorithm 132 by rotating about the Z-body axis $Z_{body}$. The inertial measurement unit 110 is attached to the rotational device 200 and rotates by an associated amount about the Z-body axis $Z_{body}$. In one implementation of this embodiment, the rotational device 200 is positioned in a fixture (not shown) that permits an axis of the rotational device 200 to align to the earth's gravitational field. In such an embodiment, the fixedly attached inertial measurement unit 110 can be affixed to the rotational device 200 in which the Z-body axis $Z_{body}$ is always parallel to the vertical-earth axis $Z_{earth}$.

During the rotation step (forward-rotation step), the Kalman filter 320 receives position input for the vehicle 105 from the aiding sensor 147 and the rotational compensator 250. When the inertial measurement unit 110 is being forward-rotated, the Kalman filter 148 estimates and corrects for the heading error of inertial measurement unit 110 based on the input from the aiding sensor 147 and the rotational compensator 250. The rotational compensator 250 corrects for the rotational motion (about the Z-body axis $Z_{body}$) of the rotating inertial measurement unit 110, so that the output of the navigation module 311, after it is processed by the rotational compensator 250, appears as though the inertial measurement unit 110 is not rotating about the Z-body axis $Z_{body}$. The Kalman filter 320 processing estimate the errors generated by navigation module 311, rotational control algorithm 132, and rotational device 200.

In one implementation of this embodiment, the rotational control algorithm 132 is a timing algorithm 132. In that case, the timing algorithm indicates a start-time of the forward-rotating, a stop time of the forward-rotating, and a forward-direction of rotation (e.g., clockwise (CW) or counter-clockwise (CCW) about the Z-body axis $Z_{body}$). The inertial measurement unit 110 is reoriented from the first orientation 170 to the second orientation 171 between the start-time and the stop-time of the forward-rotating.

The first-horizontal-sensing gyroscope 111, the second-horizontal-sensing gyroscope 112, and the vertical-sensing gyroscope 113 in the inertial measurement unit 110 continue to operate while the inertial measurement unit 110 is oriented in the second orientation 171 for the pre-selected time duration (block 308). The Kalman filter 320 receives position input for the vehicle 105 from the aiding sensor 147 and a navigation solution 280 from the navigation module 311 during this time. The Kalman filter 148 estimates and corrects for the heading error of the navigation solution when the inertial measurement unit 110 is in the first orientation 170 based on the input from the aiding sensor 147 and the rotational compensator 250.

While the inertial measurement unit 110 continues to operate, the inertial measurement unit 110 is reverse-rotated about the Z-body axis $Z_{body}$ by the selected-rotation angle (block 310) so that the inertial measurement unit 110 is reoriented in the first orientation 170. The reverse-rotating is sensed at the rotational position sensor 131 (block 312). The time taken to rotate in the reverse direction (e.g., CCW or CW, whichever is opposite the direction of the forward-rotation) during block 213 equals the time taken to rotate in the forward direction during block 304. The Kalman filter 320 receives input and corrects for the heading error as described above during the reverse-rotation. The rotation allows the turn-on to turn-on biases to be physically distributed. By having the inertial measurement unit 110 oriented in two positions the error is distributed (half of the time the error is positive and half of the time the error is negative).

The rotational control algorithm 132 controls the reverse-rotating. The rotational control algorithm 132 sends instructions to the rotational device 200 to start and stop the reverse-rotation. The rotational device 200 responds to the rotation-instructions from the rotational control algorithm 132 by rotating about the Z-body axis $Z_{body}$ as described above, but the direction of rotation is the reverse of that of block 304. When the reverse-rotation step is completed, the inertial measurement unit 110 is reoriented in a first orientation 171 as shown in FIG. 2A. The rotating of the inertial measurement unit 110 back and forth is referred to herein as carouselling.

In one implementation of this embodiment, the forward-rotation step and the reverse-rotation step are each 10 seconds in duration. In another implementation of this embodiment, the forward-rotation step and the reverse-rotation step are each 2 seconds in duration.

In embodiments in which the rotational control algorithm 132 is a timing algorithm 132, the timing algorithm indicates a start-time of the reverse-rotating, a stop time of the reverse-rotating, and a reverse-direction of rotation (e.g., CW or CCW). The inertial measurement unit 110 moves from the first orientation 170 to the second orientation 171 between the start-time and the stop-time of the reverse-rotating.

The three-orthogonally-mounted gyroscopes (the first-horizontal-sensing gyroscope 111, the second-horizontal-sensing gyroscope 112, and the vertical-sensing gyroscope 113) in the inertial measurement unit 110 are operated while the vehicle 105 is moving or stationary and the inertial measurement unit 110 is reoriented in the first orientation 170 (block 314). The inertial measurement unit 110 is held in the first orientation 170 for the pre-selected time duration. In all embodiments, the inertial measurement unit 110 is in the first orientation 170 fifty percent of the time and the second orientation 171 the other fifty percent of the time (given the rotation time is negligible with reference to the pre-selected time duration). The Kalman filter 320 receives position input for the vehicle 105 from the aiding sensor 147 and a navigation solution 280 from the rotational compensator 250 during this time. The Kalman filter 148 estimates and corrects for the heading error of the navigation module 311 when the inertial measurement unit 110 is re-oriented in the first orientation 170 based on the input from the aiding sensor 147 and the rotational compensator 250.

The rotational compensator 250 continuously receives information indicative of the orientation of the inertial measurement unit 110 (block 316) from the rotational position sensor 131. The rotational compensator 250 continuously-rotationally compensates the navigation module output received from the navigation module 311 (block 318). Thus, the output of the rotational compensator 250 is independent of the rotating. Specifically, the rotational compensator 250 removes the rotational effects from the generated navigation data output of the navigation module 311 while the inertial measurement unit 110 is operating in the first orientation 270 or the second orientation 271, or while the inertial measurement unit 110 is forward-rotating (e.g., CW) or reverse-rotating (e.g., CCW). The output of rotational compensator 250 is a navigation solution 280. The navigation solution 280 is sent to the Kalman filter 320 and the external system 30.

The Kalman filter 320 applies an attitude correction to the navigation solution 280, based on the operations while in the first orientation 170, during the forward-rotating, while in the second orientation 171, and during the reverse-rotating. By operating the inertial measurement unit 110 while in the first orientation 171 and the second orientation 172 for equal time durations and while forward-rotating and reverse-rotating for equal time durations, the heading error is physically cancelled at the navigation module 311.

FIGS. 4A-4D show an inertial measurement unit 110 positioned in a first orientation 270, a second orientation 271, a third orientation 272, and a fourth orientation 273, respectively, in accordance with the present invention. From the fourth orientation, the inertial measurement unit 110 is forward-rotated to a fifth orientation that is identical to the first orientation 270. The rotational device 200 (FIG. 1) is configured to forward-rotate the inertial measurement unit 110 about the vertical-Z-body axis $Z_{body}$ from the first orientation 270 (FIG. 4A) to the second orientation 271 (FIG. 4B) to the third orientation 272 (FIG. 4C) to the fourth orientation 273 (FIG. 4D) and to the fifth orientation 270. Then the rotational device 200 (FIG. 1) is configured to reverse-rotate the inertial measurement unit 110 about the vertical-Z-body axis $Z_{body}$ from the fifth orientation 270 to the fourth orientation 273 to the third orientation 272 to the second orientation 271 and back to the first orientation 270. In the embodiments shown in FIGS. 4A-4D, there are 4 rotational steps to rotate the inertial measurement unit 110 through a selected-rotation angle of 90 degrees.

The physical act of forward rotating the inertial measurement unit 110 by 360 degrees about the Z-body axis $Z_{body}$ and then reverse rotating the inertial measurement unit 110 about the Z-body axis $Z_{body}$ by 360 degrees physically distributes (and thereby reduces) the long-term bias error in the gyroscopes 111-113 in the inertial measurement unit 110. The orientations must be in sets, e.g., (0°, 180° or (90°, 180°, 270°, 360°). In one implementation of this embodiment, the inertial measurement unit 110 is continuously rotated forward and then backward (reverse) about the Z-body axis $Z_{body}$.

The Kalman filter 320 applies an attitude, position, and velocity corrections to the navigation solution 280 based on the operations in the first orientation 270, the second orientation 271, the third orientation 272, the fourth orientation 273 and the fifth orientation 270, while the inertial measurement unit 110 is forward-rotating and reverse-rotating through 90 degree forward-rotational steps and reverse-rotational steps. By operating the inertial measurement unit 110 while in the first orientation 270, the second orientation 271, the third orientation 272, the fourth orientation 273, and the fifth orientation 270 for equal time durations and while forward-rotating and reverse-rotating for equal time durations, the heading error is physically cancelled.

The sensor compensation module 305 receives information indicative of the sensor errors in the inertial measurement unit 110 as estimated by the Kalman filter 320 during the 360° forward-rotations and reverse-rotations. The sensor compensation module 305 removes the inertial measurement unit errors estimated by the Kalman filter 320. The rotational compensator 250 continuously-rotationally compensates the navigation module output using data from the rotational position sensor 131. The rotational compensator 250 also receives information indicative of the rotational errors in the rotational device 200 or the rotational position sensor 131 from the Kalman filter 320. The output of the rotational compensator 250 is independent of the rotating of the inertial measurement unit 110.

In this manner, the inertial navigation system 100 is able to include an inertial measurement unit 110 that has low-quality inexpensive gyroscopes, such as micro-electro-mechanical system (MEMS) sensors with greater than 2 degrees per hour long-term bias with reduced heading drift during free inertial navigation.

In one implementation of this embodiment, the corrections are applied when the inertial measurement unit 110 is in the first orientation 170. In this case, the system is left to drift in the other orientations (e.g., 171-173). The Kalman filter 320 computes errors in the non-rotating navigation solution 280 and applies those corrections to the navigation module 311 and the sensor compensation module 305. The Kalman filer 320 also sends corrections to the rotation control algorithm 132 and the rotational compensator 250 to improve the ability of the rotation control algorithm 132 to cause a symmetric evenly distributed rotation and to improve the ability of the rotational compensator 250 to remove motion caused by the rotation device 200.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An inertial navigation system, comprising:
an inertial measurement unit including at least three sensors including at least one gyroscope and at least two accelerometers;
a rotational device on which the inertial measurement unit including the at least three sensors is positioned, the rotational device configured to simultaneously rotate the at least three sensors positioned on the rotational device about a Z-body axis of the inertial navigation system from a first orientation to a second orientation;
a rotational position sensor to sense:
  a forward-rotation of the inertial measurement unit first from the first orientation to the second orientation and then a reverse-rotation of the inertial measurement unit from the second orientation to the first orientation; or
  a forward-rotation of the inertial measurement unit first from the first orientation through the second orientation to first orientation and then a reverse-rotation of the inertial measurement unit from the first orientation through the second orientation to the first orientation,
wherein the inertial measurement unit operates first while forward-rotating and then while reverse-rotating;
a software module stored in a non-transitory storage medium including:
  a rotational control algorithm configured, when executed by a processor, to control the rotation of the rotational device;
  a rotational compensator;
  a sensor compensation module configured to receive input from the inertial measurement unit;
  a navigation module configured, when executed by the processor, to receive input from the sensor compensation module; and
  a Kalman filter communicatively coupled to send error correction data to the navigation module, the sensor compensation module, the rotational control algorithm, and the rotational compensator; and
the processor configured to execute the software module, wherein the rotational compensator receives information indicative of an orientation of the inertial measurement unit from the rotational position sensor and from the rotational control algorithm, and, when executed by the processor, the rotational compensator compensates for the rotation of the inertial measurement unit about the Z-body axis, wherein navigational data output from the rotational compensator is compensated for the forward-rotation and the subsequent reverse-rotation of the inertial measurement unit, wherein the software module is configured, when executed:
- to remove the effect of the forward-rotation and the subsequent reverse-rotation of the inertial measurement unit; and
- to generate error correction data based on the operation of the inertial measurement unit first while forward-rotating and then while reverse-rotating, and wherein gyroscope bias errors are distributed based on consecutive operations of the inertial measurement unit in the first orientation and the second orientation, and wherein a heading error of the inertial navigation system is reduced by the distribution of the gyroscope bias errors.

2. The inertial navigation system of claim 1, further comprising an aiding sensor to input information to the Kalman filter.

3. The inertial navigation system of claim 1, wherein the at least three sensors of the inertial measurement unit include a first-horizontal-sensing gyroscope, a second-horizontal-sensing gyroscope, and a vertical-sensing gyroscope, the gyroscopes being orthogonally mounted.

4. The inertial navigation system of claim 1, wherein the rotational device is configured to rotate the inertial measurement unit by one hundred eighty degrees from the first orientation to the second orientation in at least one rotation step.

5. The inertial navigation system of claim 1, wherein the inertial measurement unit is a micro-electro-mechanical system (MEMS) inertial measurement unit.

6. The inertial navigation system of claim 3, wherein the Z-body axis of the inertial navigation system is parallel to an input axis of the vertical-sensing gyroscope.

7. The inertial navigation system of claim 6, further comprising:
- a fixture in which the rotational device is fixedly attached, wherein the fixture permits the input axis of the vertical-sensing gyroscope to align to a gravitational field of the earth, wherein the Z-body axis is parallel to a vertical-earth axis while the rotational position sensor rotates about the Z-body axis.

8. The inertial navigation system of claim 3, further comprising:
- a fixture in which the rotational device is fixedly attached, wherein the fixture permits an axis of the rotational device to align to a gravitational field of the earth, wherein the Z-body axis $Z_{body}$ is parallel to a vertical-earth axis while the rotational position sensor rotates about the Z-body axis.

* * * * *